US006671943B1

(12) United States Patent

Mori et al.

(10) Patent No.: US 6,671,943 B1

(45) Date of Patent: *Jan. 6, 2004

(54) METHOD OF MANUFACTURING A PISTON

(75) Inventors: Kazuhiko Mori, Okazaki (JP); Kouta Kodama, Toyota (JP); Taisuke Miyamoto, Okazaki (JP); Yoshio Fuwa, Toyota (JP); Kouji Saitoh, Toyota (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/993,316

(22) Filed: Dec. 18, 1997

Related U.S. Application Data

(63) Continuation of application No. 08/993,316, filed on Dec. 18, 1997, which is a continuation of application No. 08/463,484, filed on Jun. 5, 1995, now abandoned.

(30) Foreign Application Priority Data

Jun. 6, 1994 (JP) .......................................... 6-124073
Dec. 29, 1994 (JP) .......................................... 6-339901

(51) Int. Cl.[7] .......................... B23P 15/08; B05D 1/02; F02F 3/00

(52) U.S. Cl. ................ 29/527.2; 29/527.4; 29/888.049; 427/421; 427/427; 427/456; 123/193.6

(58) Field of Search ............................ 29/527.2, 527.4, 29/888.044, 888.046, 888.049, 527.3; 427/421, 427, 456, 424; 92/223; 148/415; 123/193.6

(56) References Cited

U.S. PATENT DOCUMENTS 3,041,116 A 6/1962 Rosen et al. ............. 123/193.6
3,715,790 A * 2/1973 Reinberger ............ 29/888.048

(List continued on next page.)

FOREIGN PATENT DOCUMENTS

GB 1-083003 9/1967
GB 2026649 2/1980

(List continued on next page.)

OTHER PUBLICATIONS

Statement of Relevancy for Japanese Unexamined Patent Publication No. 61–166962, 60–208468, 6–37544, 50–4330, and 50–26937.

(List continued on next page.)

*Primary Examiner*—A. Dexter Tugbang
(74) *Attorney, Agent, or Firm*—Finnegan, Henderson, Farabow, Garrett & Dunner, LLP

(57) ABSTRACT

In a method of manufacturing a sliding member, a granular spraying material is sprayed on at least a part of a surface of a body portion made of a structural material in at least partially fusing condition and in the direction which is parallel to or diagonal to a sliding surface. Then, a sprayed layer is formed by depositing the spraying material in the direction which is perpendicular to the sliding surface. The sliding surface is a section of the deposited spraying material which is obtained by grinding or cutting the sprayed layer in depositional direction. A piston comprises a piston body having a broad groove which is broader than a ring groove, a sprayed layer comprising a lower sprayed layer which is formed by spraying the spraying material in the direction which is diagonal to an outer periphery of the broad groove and which contains higher ratio of spraying particles having low fusion temperature, and an upper sprayed layer which is formed by spraying the spraying material in the direction which is perpendicular to the outer periphery of the broad groove and which contains higher ratio of spraying particles having high fusion temperature, and a ring groove which is formed by grinding or cutting the upper sprayed layer in depositional direction. Therefore, excellent wear resistance and the like can be obtained.

7 Claims, 10 Drawing Sheets

U.S. PATENT DOCUMENTS

| | | | | | |
|---|---|---|---|---|---|
| 3,886,637 | A | * | 6/1975 | Ellis et al. | 29/527.3 |
| 4,125,926 | A | | 11/1978 | Gale et al. | 29/888.03 |
| 4,523,365 | A | | 6/1985 | Richmond | 29/527.4 |
| 4,666,733 | A | * | 5/1987 | Wlodek | 427/424 |
| 4,985,092 | A | * | 1/1991 | Kaede et al. | 148/326 |
| 4,987,867 | A | * | 1/1991 | Suzuki et al. | 92/223 |
| 5,119,777 | A | * | 6/1992 | Mielke et al. | 29/888.046 |
| 5,301,599 | A | * | 4/1994 | Dearnley et al. | 29/888.049 |
| 5,421,919 | A | * | 6/1995 | Roman et al. | 427/456 |
| 5,425,306 | A | * | 6/1995 | Binford | 123/193.6 |
| 5,516,483 | A | * | 5/1996 | Shivannath et al. | 419/14 |
| 5,607,523 | A | * | 3/1997 | Masumoto et al. | 148/415 |
| 5,632,827 | A | * | 5/1997 | Fujita et al. | 148/415 |
| 5,653,021 | A | * | 8/1997 | Matsuyama et al. | 92/223 |
| 5,712,000 | A | * | 1/1998 | Wei et al. | 427/573 |
| 5,756,150 | A | * | 5/1998 | Mori et al. | 427/197 |
| 5,952,056 | A | * | 9/1999 | Jordan et al. | 427/424 |

FOREIGN PATENT DOCUMENTS

| | | |
|---|---|---|
| JP | 50-4330 | 2/1975 |
| JP | 50-26937 | 3/1975 |
| JP | 60-208468 | 10/1985 |
| JP | 61-166962 | 7/1986 |
| JP | 63-317272 | 12/1988 |
| JP | 5-44838 | 2/1993 |
| JP | 6-37544 | 5/1994 |

OTHER PUBLICATIONS

English Abstract of Japan Publication No. 05044838, *Patent Abstracts of Japan*, vol. 017, No. 350 (M–1438), Jul. 1993.

English Abstract of Japan Publication No. 63140066, *Patent Abstracts of Japan*, vol. 012, No. 398 (C–538), Oct. 1988.

Database WPI, Section Ch, Week 8313, Derwent Publication Ltd., Class M13, AN 83–30715K & JP 810125261 810812.

Rosen, "Aluminum Pistons", Railway Locomotives and Cars, Aug. 1955.

* cited by examiner

METHOD OF MANUFACTURING A PISTON

This is a continuation of application Ser. No. 08/993,316, filed Dec. 18, 1997, which is a continuation of application Ser. No. 08/463,484, filed Jun. 5, 1995, now abandoned.

BACKGROUND OF THE INVENTION

1. Field of the Invention

The present invention relates to a method of spraying different spraying materials in depositional direction, a method of manufacturing a sliding member having a sliding surface which shows excellent wear resistance, a piston having a ring groove which shows excellent wear resistance and a method of manufacturing the same.

2. Description of Related Art

In a diesel engine, a top ring groove portion of an aluminum piston is not heat-resistant. Recently, in accordance with a regulation of exhaust gases, it is necessary to control oil consumption, and to make the burning temperature higher. Such needs are more and more severe on a piston ring and a piston, and the above method cannot meet them. Namely, enough oil lubrication or cooling cannot be obtained by a piston ring groove, especially, a top ring groove. So, abrasion occurs between a piston ring and a ring groove.

Conventionally, an attempt that a heat- and wear-resistant layer is formed on a top ring groove portion of a piston by spraying has been made. In spraying, since a base material and a spraying material are freely selected, it is reported that many wear-resistant materials are sprayed. Incidentally, a piston ring groove of a diesel engine of automobiles is a rectangle groove having an inlet of 2 mm and the depth of 5 mm. So, when spraying is performed straight, a spraying angle becomes extremely small, and it is difficult to coat a sprayed layer along the shape of the groove.

On the contrary, as shown in FIG. 17 in Japanese Unexamined Patent Publication (KOKAI) No. 44838/1993, an upper end portion of a groove is chamfered so that a spraying angle can be obtained. In this method, although a sprayed layer is formed on a lower surface of the groove, an upper surface is restored by filling metals. So, a process becomes complicated, and the whole surface of the groove is not treated. Therefore, partial adhesion or abrasion may occur. Furthermore, since the spraying angle is not perpendicular to a treated surface, an adhesion strength of a sprayed coating is declined, and rebound particles are deposited at the groove depth, thereby forming a porous layer. Thus, the quality of the sprayed coating may be deteriorated.

SUMMARY OF THE INVENTION

Accordingly, it is an object Of the present invention to provide a piston and a method of manufacturing a sliding member having a sliding surface which comprises a sprayed layer having higher wear resistance and excellent stability as compared with the conventional sprayed layer.

Inventors found out the following matter. When a spraying material comprising not less than two kinds of spraying particles is diagonally sprayed to a surface of an object, spraying particles having low fusion temperature are primarily adhered to the surface of the object, and it is possible to obtain a sprayed layer which contains high ratio of spraying particles having low fusion temperature and whose composition is different from that of the spraying material. They confirmed that the composition of the sprayed layer is somewhat changed by varying the spraying angle to the surface of the object.

Inventors also noticed the following matter. When the sprayed layer is formed by spraying, each spraying particle collides with an object, and it is mashed and shaped like a thin disk, thereby depositing on the surface of the object. Normally, the direction which is perpendicular to depositional direction of the above sprayed layer, namely, the surface on which each spraying particle spreads in the shape of a thin disk is utilized as a sliding surface. They paid an attention to a cut surface which is obtained by cutting the sprayed layer in depositional direction. Then, they thought that the above cut surface shows excellent wear resistance and stable coefficient of friction in consideration of fallout resistance of each spraying particle and the number of each spraying particle which is exposed on the cut surface per unit surface area. The inventors proved the above assumption by experiments.

In a method of spraying a spraying material on a surface of a base material on which a sprayed layer is to be formed, thereby forming a sprayed layer on the surface;

- the spraying material comprises not less than two kinds of spraying particles which have each different fusion temperature one another,
- a spraying angle which is formed by the surface and spraying direction is set to be small at an initial stage of spraying, and to be large after the initial stage, and
- a lower portion of the sprayed layer which is close to the surface contains higher ratio of spraying particles having low fusion temperature and lower ratio of spraying particles having high fusion temperature as compared with an upper portion of the sprayed layer which is far from the surface.

A method of manufacturing a sliding member having a sliding surface which comprises a sprayed layer comprises the steps of:

- spraying a granular spraying material on at least a part of a surface of a body portion made of a structural material in at least partially fusing condition,
- forming a sprayed layer on the surface, and
- forming a sliding surface which comprises a surface obtained by grinding or cutting the sprayed layer.

The spraying material is sprayed in the direction which is parallel to or diagonal to the sliding surface, so the spraying material is deposited in the direction which is perpendicular to the sliding surface. The sliding surface is a section of the deposited spraying material which is obtained by grinding or cutting the deposited spraying material in depositional direction.

A piston having at least one ring groove at an outer periphery which is slided and brought into contact with an inner periphery of a cylinder comprises:

- a piston body having a broad groove which is broader than the ring groove at the outer periphery,
- a sprayed layer which is formed by spraying a spraying material into the broad groove of the piston body in the direction which is perpendicular to the outer periphery, and depositing the spraying material in the broad groove in the direction toward depth, and
- a ring groove which is formed by grinding or cutting the sprayed layer in depositional direction.

A method of manufacturing a piston having at least one ring groove at an outer periphery which is slided and brought into contact with an inner periphery of a cylinder comprises the steps of:

- forming a broad groove which is broader than the ring groove at the outer periphery, primarily spraying a spraying material, which comprises not less than two kinds of spraying particles having each different fusion temperature one another, in the direction which is diagonal to the surface of the broad groove at low spraying angle, forming a lower sprayed layer which contains higher ratio of spraying particles having low fusion temperature, secondarily spraying the spraying material on the lower sprayed layer at higher spraying angle than that of the lower sprayed layer, forming an upper sprayed layer which contains lower ratio of spraying particles having low fusion temperature, and forming a ring groove in the upper sprayed layer.

In the present invention, the spraying material comprises not less than two kinds of spraying particles having each different fusion temperature one another, and the composition ratio of the sprayed layer can be changed by varying the spraying angle. As a result, it is possible that the lower portion of the sprayed layer contains higher ratio of material having high affinity to the base material, and that the upper portion of the sprayed layer contains higher ratio of material having some characteristics which is desirable for the sprayed layer.

In the method of manufacturing the sliding member having the sliding surface which comprises the sprayed layer according to the present invention, the sprayed layer is formed by depositing the spraying material on the surface of the sliding member on which the sprayed layer is to be formed. After that, the sliding surface is formed in the depositional direction of the sprayed layer, and the sliding member can be obtained. The edge surface of each spraying material which is disposed in the shape of a thin disk by spraying is exposed on the sliding surface. As a result, the area of each spraying material which is exposed on the sliding surface is narrow. The sliding surface is formed by a large number of spraying materials. So, the sliding surface hardly shows friction characteristics of a specific spraying material or some spraying materials. It exhibits average friction characteristics of whole spraying materials. Therefore, stable coefficient of friction can be obtained.

Each spraying material is arranged in such a manner that it stands against the sliding surface. One end of each sprayed layer forms the sliding surface, and the other end of each sprayed layer is inside and far from the sliding surface. Each spraying material for forming the sliding surface is hardly comes off from the sliding surface. So, abrasion which is caused by fallout hardly occurs. Since the area of one piece of the spraying material which is exposed on the sliding surface is narrow, stress which is acted on one piece of spraying material is small. Therefore, fallout of the spraying material comes to rarely occur, and wear resistance becomes excellent.

Such characteristics is suitable for the piston of the present invention, and the ring groove of the piston shows remarkably excellent wear resistance.

In the method of manufacturing the piston of the present invention, the afore-mentioned method of spraying material is used for the method of manufacturing the piston, and it is possible to form the upper sprayed layer and the lower sprayed layer by using the same spraying material. Furthermore, since the ring groove is formed in the upper sprayed layer, the ring groove can obtain high wear resistance and can be operated with the piston body integrally.

BRIEF DESCRIPTION OF THE DRAWINGS

FIG. 8(*b*) is a typical enlarged section diagram for showing a sliding surface of the present sprayed layer.

DETAILED DESCRIPTION OF THE PREFERRED EMBODIMENTS

Hereinafter, embodiments of the present invention will be explained with reference to FIGS. 1 through 17.

First Embodiment

The first embodiment relates to a piston made of aluminum alloy having a top ring groove which is formed by grinding a sprayed layer in depositional direction and a method of manufacturing the same.

Figure 1:
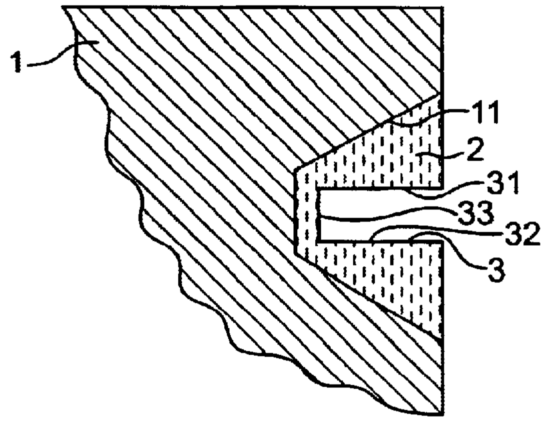
FIG. 1 is an enlarged section diagram for showing an edge portion of a piston in the first embodiment of the present invention.
Figure 2:
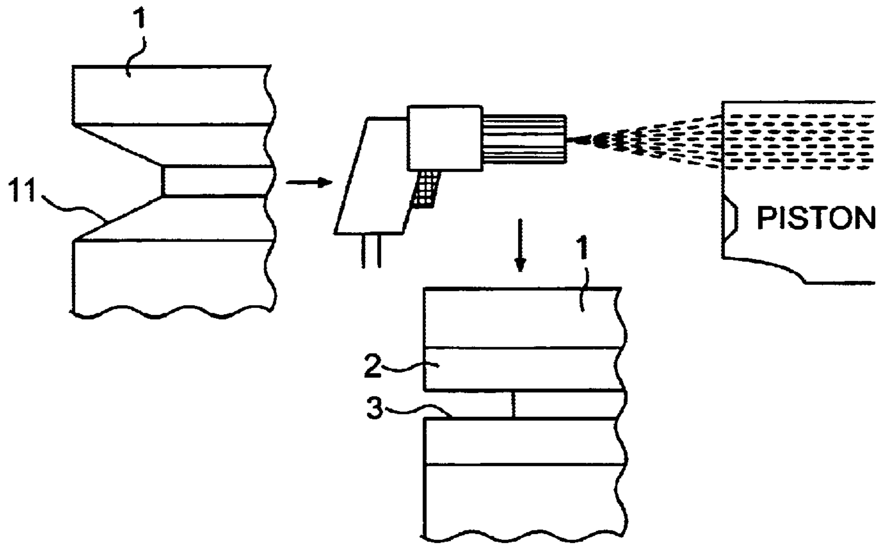
FIG. 2 is a typical diagram for showing a process for forming a top ring groove of the piston in the first embodiment of the present invention.

As shown in FIG. 1, the piston comprises a piston body 1 made of aluminum alloy, a sprayed layer 2 which encircles an edge portion of the piston 1 and is formed by spraying and a top ring groove 3 which is formed on the sprayed layer 2. As shown in FIG. 2, the piston body 1 has a sectional trapezoidal-shaped groove 11 which encircles an outer periphery of an edge periphery portion. The groove 11 is deeper and broader than the top ring groove 3 as shown in FIG. 1. In this embodiment, the depth of the groove 11 is deeper than that of the top ring groove 3 by at least 0.1 mm. The half length of the base of the groove 11 is longer than that of the base of the top ring groove 3 by at least 0.1 mm. Furthermore, the angle of a sliding surface of the groove 11 is 75 degrees to a side surface.

As shown in FIG. 2, the sprayed layer 2 is formed by spraying a spraying material in the direction which is perpendicular to a side surface of the piston body 1, and by filling the groove 11. A granular spraying material collides with the base of the groove 11 in semi-fusing condition. Then, it spreads in the shape of a thin disk and adheres to the base. After that, the spraying material is collided and disposed one after another. As shown by broken lines in FIG. 1, these spraying materials are disposed in the direction toward depth of the groove 11, and the sprayed layer 2 is formed.

The top ring groove 3 is formed by cutting the sprayed layer 2. As shown in FIG. 1, the top ring groove 3 is marked off by a base 33 and two opposed surfaces 31 and 32 which are opposite to each other and spread in the direction toward depth. The opposed surfaces 31 and 32 spread in depositional direction of the spraying material. A thin side surface of each spraying material is exposed on the opposed surfaces 31 and 32 in the condition that each spraying material is deposited. On the contrary, the base 33 is parallel to the surface on which the spraying material spreads. So, each spraying material is exposed on the base 33 in the condition that it spreads on the base 33.

A top ring (not shown) is installed in the top ring groove 3, and the top ring is slided and brought into contact with the top ring groove 3. The top ring is also slided and brought into contact with a wall surface of a cylinder, and it improves airtightness between the wall surface of the cylinder and the piston. The top ring is alternatively brought into contact with the opposed surfaces 31 and 32 of the top ring groove 3 by reciprocation of the piston.

In the piston of this embodiment, the opposed surfaces 31 and 32 of the top ring groove 3 is a section of the deposited spraying material. The edge surface of each spraying material which is disposed in the shape of a thin disk by spraying is exposed on the opposed surfaces 31 and 32. As a result, the area of each spraying material which is exposed on the opposed surfaces 31 and 32 is narrow. The opposed surfaces 31 and 32 are formed by a large number of spraying materials. So, the opposed surfaces 31 and 32 hardly show friction characteristics of a specific spraying material or some spraying materials. They exhibit average friction characteristics of whole spraying materials. Therefore, stable coefficient of friction can be obtained.

Each spraying material is arranged in such a manner that it stands against the opposed surfaces 31 and 32. One end of each sprayed layer forms the opposed surface, and the other end of each sprayed layer is inside and far from the opposed surfaces 31 and 32. Each spraying material for forming the opposed surfaces 31 and 32 is hardly come off from the opposed surfaces 31 and 32. So, abrasion which is caused by fallout hardly occurs. Since the area of one piece of the spraying material which is exposed on the opposed surfaces 31 and 32 is narrow, stress which is acted on one piece of spraying material is small. Therefore, fallout of the spraying material comes to rarely occur, and wear resistance becomes excellent.

In the piston of this embodiment, the sprayed layer 2 is formed in order to form the top ring groove 3. However, it is possible to form other ring grooves in the same manner that the top ring groove is formed on the sprayed layer 2.

In this embodiment, the thickness of the thinnest part of the sprayed layer between the top ring groove 3 and the piston body 1 is set to be 0.1 mm because the piston body 1 is made of aluminum alloy. If the piston body 1 is made of iron alloy, the thickness of the thinnest part of the sprayed layer can be thinner than 0.1 mm. In this embodiment, the angle of the sliding surface of the groove 11 is set to be 75 degrees. There is no problem that the angle "theta" is not more than 75 degrees in order to maintain adhesion strength and to prevent coating from being porous due to rebound particles. It is preferable that the angle "theta" is not more than 60 degrees. However, if the angle becomes smaller, an opening portion of the groove 11 becomes broad, and a sectional area of the groove 11 increases. As a result, a necessary amount of spraying increases.

It is preferable that the spraying material in this embodiment has wear resistance and heat resistance. It is also preferable that the spraying material can ease internal stress in case the thickness of coating becomes thick. Furthermore, it is desirable that the spraying material shows excellent workability. In order to meet such demand, the spraying material is preferably carbon steel which comprises 5 to 40 wt % of carbide, 5 to 50 wt % of aluminum alloy and the rest of matrix after spraying.

Figure 3:
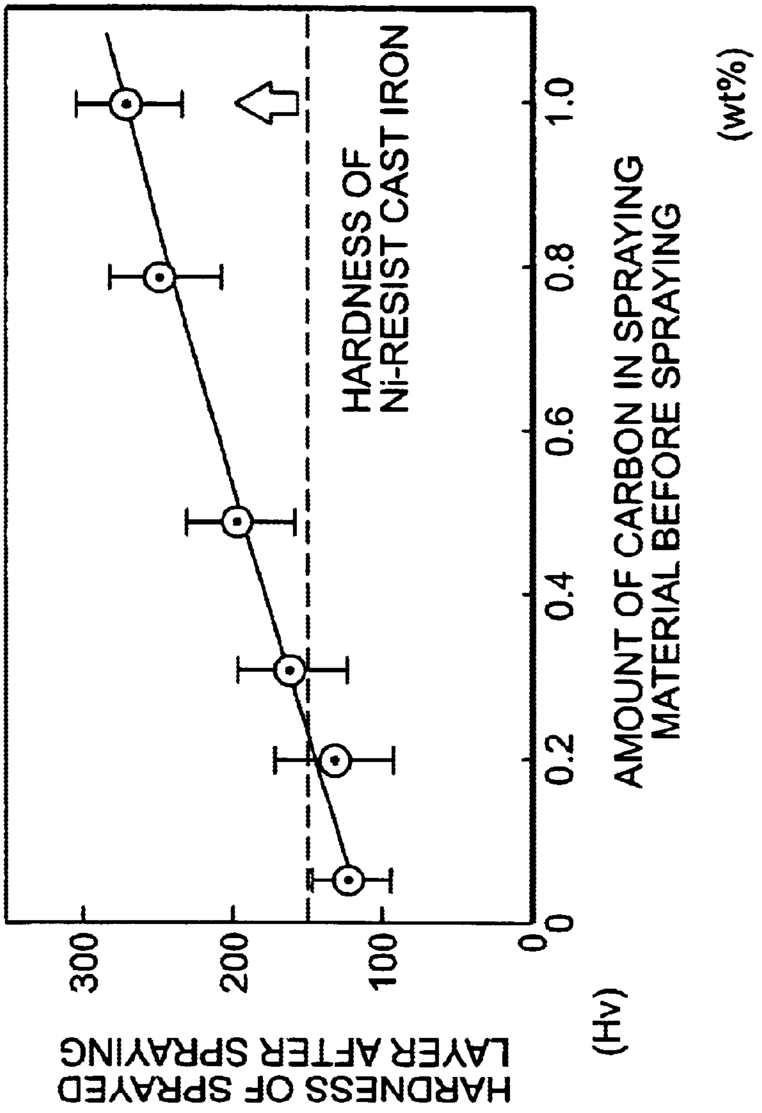
FIG. 3 is a chart for showing the relationship between the amount of carbon in a spraying material and hardness of a sprayed layer.

The above-mentioned carbon steel is the material which is necessary for maintaining the structure of the sprayed layer and for obtaining toughness and workability. It is preferable that carbon steel contains not less than 0.3 wt % of carbon, considering decarbonization at the time of spraying. FIG. 3 shows the relationship between the amount of carbon in carbon steel and hardness of the sprayed layer. As shown in FIG. 3, when the amount of carbon is 0.3 wt %, the hardness of carbon steel is higher than that of Ni-resist alloy having Hv of 140 to 150. It is preferable that the amount of carbon is 0.5 wt %. There is no problem that the amount of oxygen in carbon steel is not more than 0.5 wt %. It is preferable that the amount of oxygen is 0.2 wt %. In order to meet such demand, the spraying material includes martensite system stainless steel, tool steel and the like. Considering costs, ordinary carbon steel is satisfactory.

It is preferable that carbide shows relatively low hardness (for example, Hv about 1000) so as not to attack the piston ring with nitriding (Hv : 800 to 1100) or Cr-plating (Hv : 700 to 900). So, carbide is preferably Cr-carbide ($Cr_3C_2$ having Hv of 1300), Mo-carbide ($Mo_2C$ having Hv of 1200), Fe-carbide ($Fe_3C$ having Hv of 800 to 1200, FeCrC having Hv of 800 to 1100) or Ta-carbide (TiC having Hv of 1800). It is possible to use carbide such as Ti-carbide (TiC having Hv of 3200), V-carbide ($V_4C_3$ having Hv of 2800), Nb-carbide (NbC having Hv of 2400) or W-carbide (WC having Hv of 2400).

Figure 4:
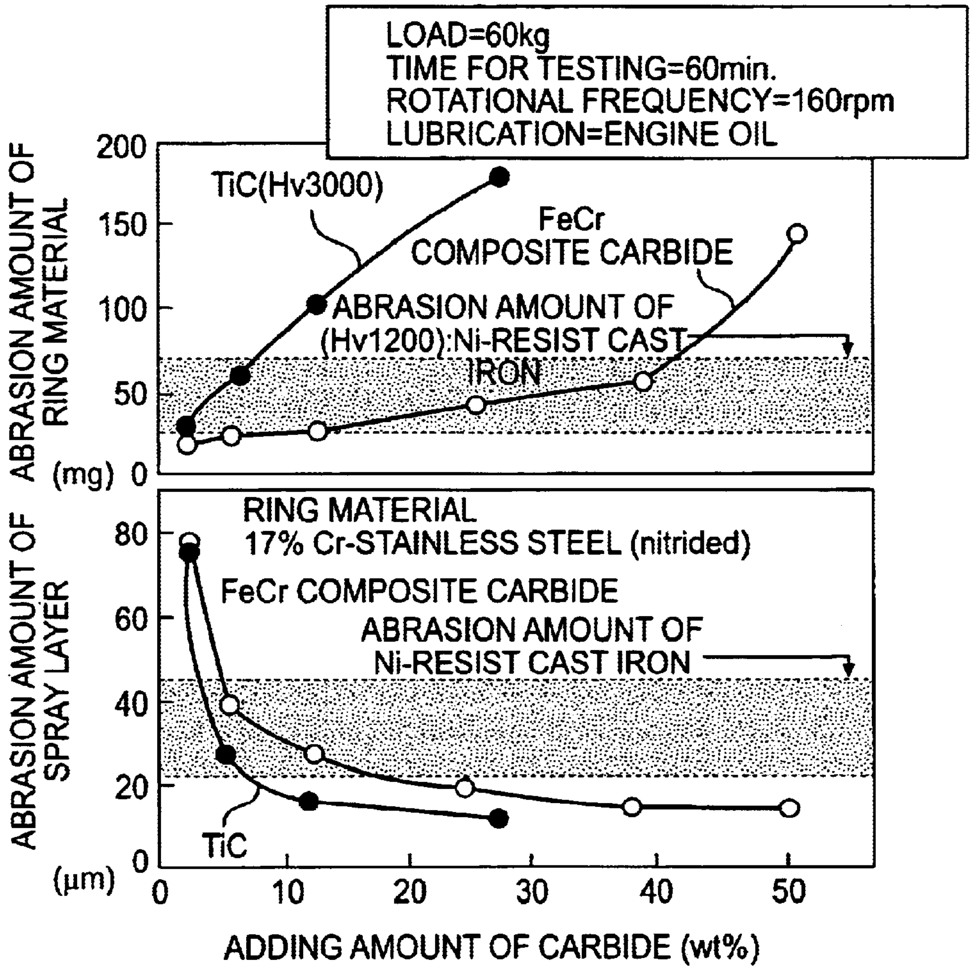
FIG. 4 are two charts: one is a chart for showing the relationship between an adding amount of carbide in the spraying material and an abrasion amount of a ring material, and the other is a chart for showing the relationship between an adding amount of carbide in the spraying material and an abrasion amount of the sprayed layer.
Figure 5:
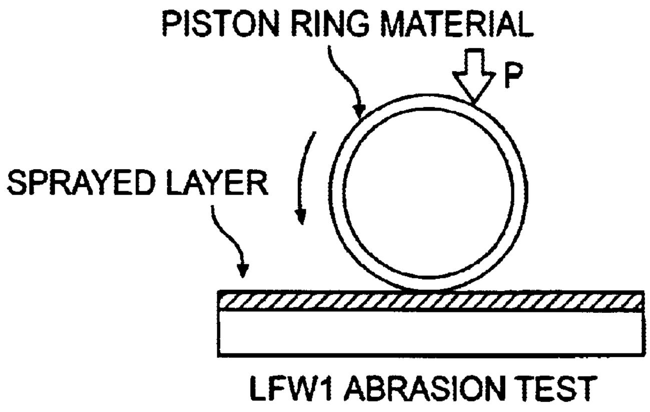
FIG. 5 is a typical diagram for showing an abrasion test of LFW1.

FIG. 4 shows the relationship between an adding amount of carbide in carbon steel (wt %) and an abrasion amount of the ring material (micron). And, FIG. 4 also shows the relationship between an adding amount of carbide in carbon steel (wt %) and an abrasion amount of the sprayed layer (micron). In FIG. 4, FeCr composite carbide comprises Fe and 60 wt % of Cr and 10 wt % of C. As shown in FIG. 5, an abrasion test is LFW1 abrasion test which is performed as follows. A sprayed layer is formed by spraying iron, steel in which an adding amount of carbide is changed on a base material made of aluminum alloy. A piston ring material having the load of 60 kg is pressed on the sprayed layer, and it rotates at rotational frequency of 160 rpm for 60 minutes. Then, the abrasion amount of the ring material and the sprayed layer can be calculated. In this test, the ring material is nitrided 17% Cr-stainless steel. In FIG. 4, the amount of abrasion against Ni-resist cast iron is shown as a band-like area. As shown in FIG. 4, when not less than 5% of carbide is added, the abrasion amount decreases. Furthermore, it is found out that FeCr composite carbide which is relatively soft rarely attacks the ring material while TiC remarkably attacks and wears the ring material.

Figure 6:
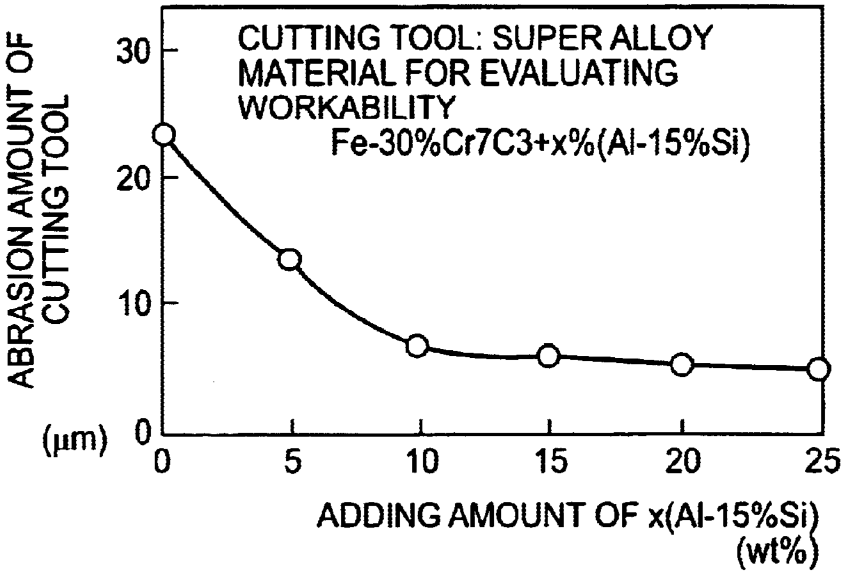
FIG. 6 is a chart for showing the relationship between an adding amount of aluminum alloy in the spraying material and an abrasion amount of a grinding cutter.

An addition of aluminum alloy contributes to ease inner stress which is caused by the difference of coefficient of thermal expansion between the sprayed layer and the base material made of aluminum. In proportion to the adding amount of aluminum, coefficient of thermal expansion of the sprayed layer becomes similar to that of the base material made of aluminum. Furthermore, the addition of aluminum alloy have remarkably excellent effect on workability. Namely, as shown in FIG. 6, when not less than 10 wt % of aluminum is added, abrasion of cutting tool remarkably decreases. This is explained as follows. Since aluminum exists between carbon steel and carbide in the sprayed layer as a different metal, chip becomes minute. Furthermore, many different materials intermittently exist so that stress decreases. As a result, workability improves.

Figure 7:
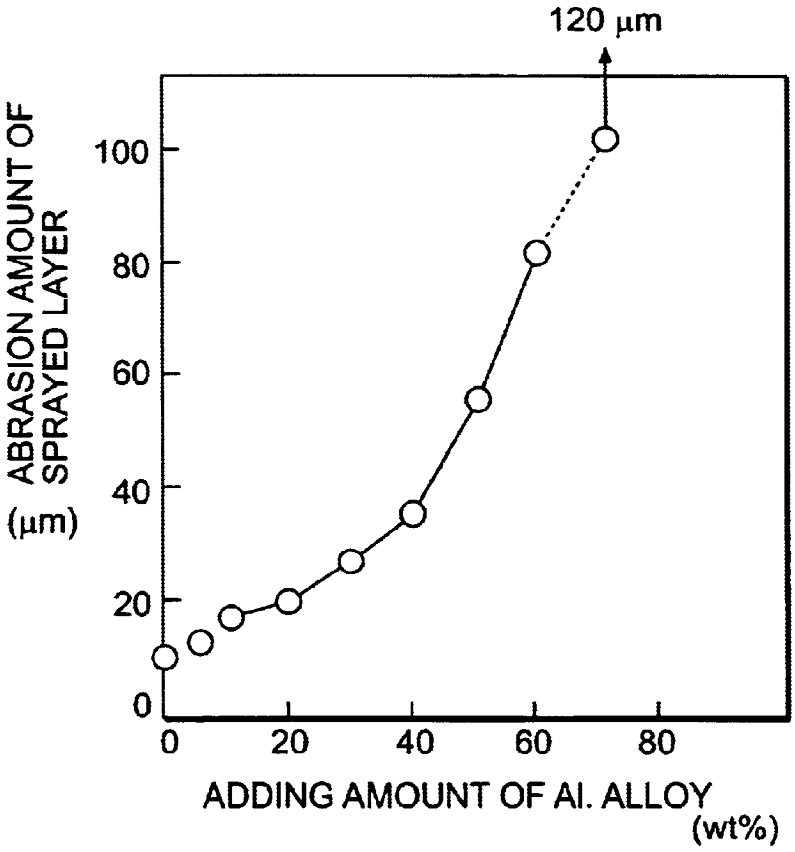
FIG. 7 is a chart for showing the relationship between an adding amount-of aluminum alloy in the spraying material and an abrasion amount of the sprayed layer.

The addition of aluminum alloy provides the above preferable action, but it deteriorates wear resistance of the sprayed layer. FIG. 7 shows the relationship between an adding amount of aluminum alloy (Al—Si alloy) and an abrasion amount. As shown in FIG. 7, the abrasion amount increases in proportion to the adding amount of aluminum alloy. Especially, when the adding amount of aluminum alloy is more than 50 wt %, the abrasion amount remarkably increases. Therefore, it is preferable that the adding amount of aluminum alloy is not more than 50 wt %.

Figure 8A:
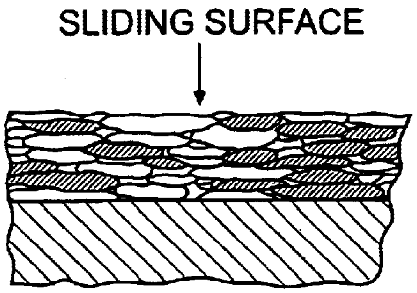
FIG. 8a PRIOR ART
FIG. 8(*a*) is a typical enlarged section diagram for showing a sliding surface of the conventional sprayed layer.
Figure 8B:
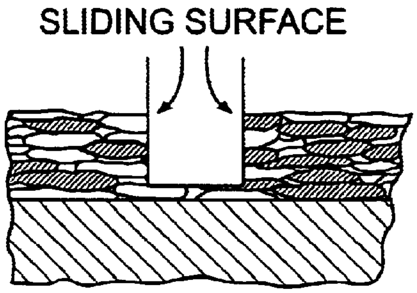

FIG. 8(*a*) shows the relationship between a sliding surface of the conventional sprayed layer and the shape of each spraying material, and FIG. 8(*b*) shows the relationship between a sliding surface of the present sprayed layer and the shape of each spraying material. As shown in FIG. 8(*a*), the sliding surface of the conventional sprayed layer is parallel to the depositional surface of the sprayed layer. When the sprayed layer is formed, the spraying material is deposited in the shape of scale (compression of 1:10 over). When the spraying material comprising many kinds of particles is sprayed, a few particular particles form the sliding surface. Therefore, the composition of the sliding surface is uneven due to dispersed condition of particles, and the abrasion characteristics is uneven. On the contrary, as shown in FIG. 8(*b*), the sliding surface of the present sprayed layer is the surface which is perpendicular to the depositional surface of the sprayed layer. Therefore, different kinds of particles frequently appear on the sliding surface, and they are mixed to show excellent friction characteristics.

Figure 9:
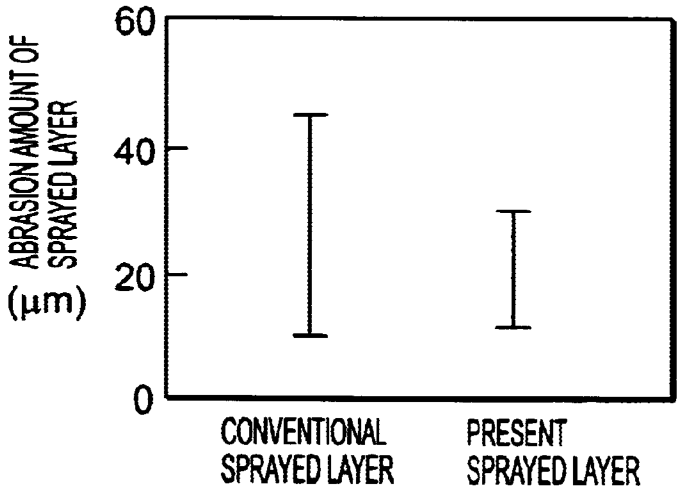
FIG. 9 is a diagram for showing an abrasion amount of each sliding surface of the conventional sprayed layer and the present sprayed layer.

FIG. 9 shows comparative result of an abrasion amount of the sliding surface between the conventional sprayed layer and the present sprayed layer. An abrasion test is also LFW1 abrasion test which is described before. A sprayed layer is formed by spraying carbon steel (Fe-0.8C) which includes 20 wt % of Fe—Cr carbide (Fe-60Cr-10C) and 20 wt % of aluminum alloy (Al-20Si) on a base material made of aluminum alloy. In the conventional sprayed layer, the sliding surface is obtained by polishing the surface which is parallel to the depositional surface. On the contrary, in the present sprayed layer, the sliding surface is obtained by cutting the deposited surface perpendicularly so that the sliding surface is perpendicular to the depositional surface. In this test, the ring material is also nitrided 17% Cr-stainless steel which is described before. A piston ring material having the load of 60 kg is -pressed on each of two sprayed layers, and it rotates at rotational frequency of 160 rpm for 60 minutes. Then, the abrasion amount of each sprayed layer can be calculated.

As seen from FIG. 9, the sliding surface of the present sprayed layer shows less abrasion amount of the sprayed layer and less unevenness of the abrasion amount as compared with the sliding surface of the conventional sprayed layer.

Figure 10:
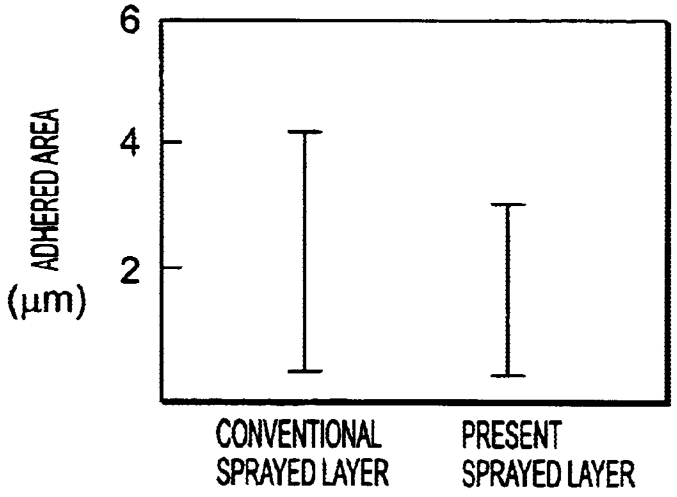
FIG. 10 is a diagram for showing an adhered area of spraying materials of each sliding surface of the conventional sprayed layer and the present sprayed layer.

Furthermore, adhesiveness which is another important friction characteristics of the piston ring groove is examined. An adhesion test is performed as follows. An actual piston ring is repeatedly pressed on the sprayed layer in the condition that the atmosphere is set to be at the piston operating temperature (250° C.). The result is shown in FIG. 10. As seen from FIG. 10, the sliding surface of the present sprayed layer shows less adhered area of the spraying material and excellent adhesive resistance as compared with the sliding surface of the conventional sprayed layer. Such adhesive resistance of the present sprayed layer is superior to that of conventional wear-resistant ring made of Ni-resist cast iron. As mentioned before, since the side surface of each spraying material is exposed on the sliding surface, adhesion hardly occurs.

Figure 11:
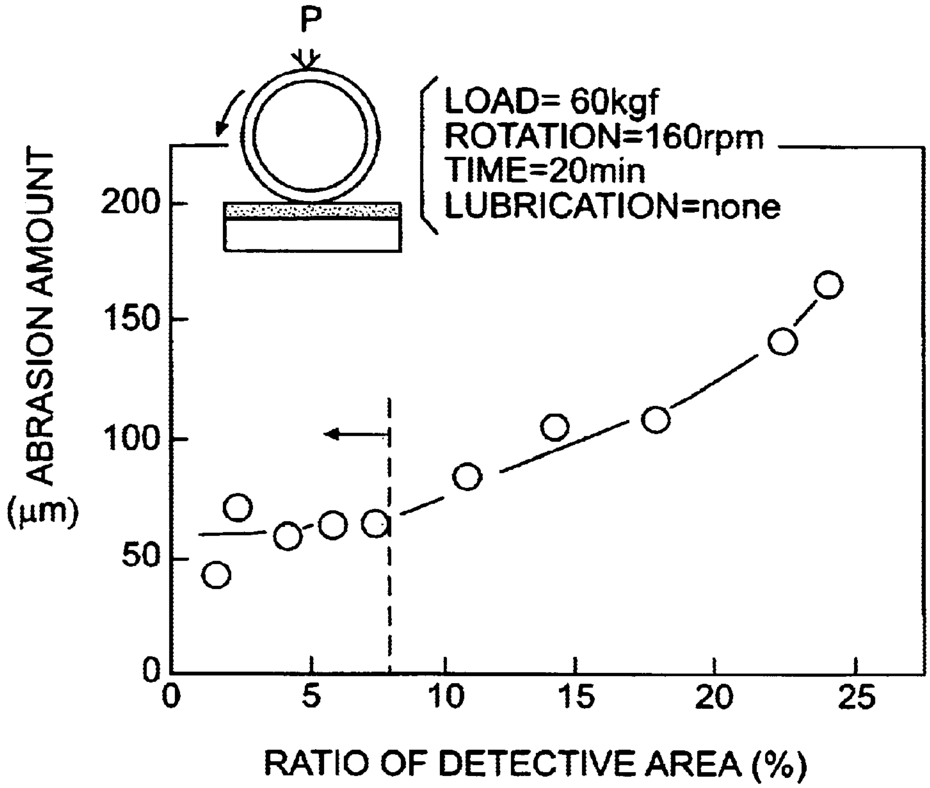
FIG. 11 is a chart for showing the relationship between the ratio of a defective area of the sliding surface and an abrasion amount of the sprayed layer.

Moreover, an effect of a defect of the sprayed layer is examined. The defect is caused by a relatively large hollow which occurs at the time of spraying or partially fallout which occurs at the time of depositing or processing. It is preferable that few defect occurs, but this is difficult task. FIG. 11 shows the relationship between an abrasion amount and a ratio of a defective area. As shown in FIG. 11, the abrasion amount increases in proportion to the defective area. A sliding abrasion test is performed at dry atmosphere (without lubrication). Due to no lubrication, the result of this test is very different from that of the afore-mentioned abrasion test. When the defect is not less than 10%, abrasion comes to increase. So, it is preferable that the defect is not more than 8%. Many defects of the sprayed layer appear on an abrasion surface of a sample which shows a large amount of abrasion. Therefore, it is found out that abrasion is promoted by the defect of the sprayed layer.

In this embodiment, the spraying material for forming the sprayed layer is applied to the top ring groove of the piston. However, the spraying material can be applied to other mechanical elements or parts having a sliding surface which requires wear resistance. Furthermore, the base material for forming the sprayed layer is not limited to aluminum, and other materials such as iron steel can be used. Moreover, it is possible to freely choose any kind of spraying material in accordance with the material of mating member or the condition of use.

Second Embodiment

The second embodiment relates to a piston made of aluminum alloy and a method of manufacturing the same. In this piston, the composition of materials of a sprayed layer of a part which is brought into contact with a piston body is different from that of materials of a sprayed layer of a part which forms a ring groove. Each part of the piston in this embodiment which is identical to that of the piston in the first embodiment is shown as the same numeral as in the first embodiment.

Figure 12:
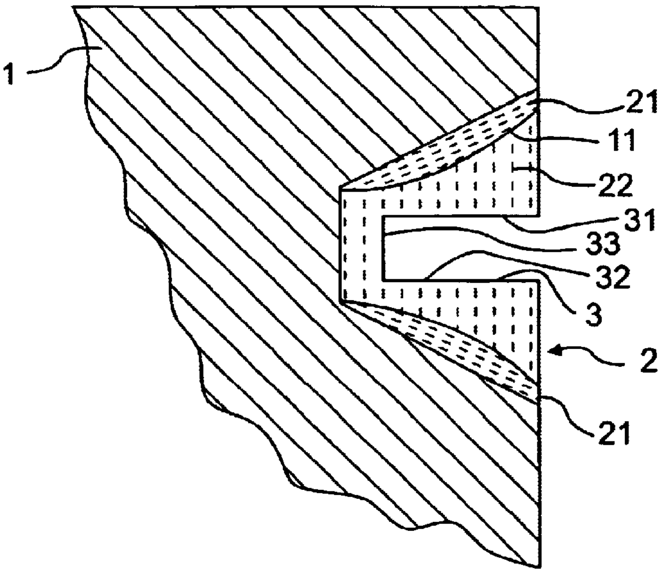
FIG. 12 is an enlarged section diagram for showing an edge portion of a piston in the second embodiment of the present invention.

As shown in FIG. 12, the piston comprises a piston body 1 made of aluminum alloy, a sprayed layer 2 which encircles an edge portion of the piston 1 and is formed by spraying and a top ring groove 3 which is formed on the sprayed layer 2. The piston body 1 has a sectional trapezoidal-shaped groove 11 which encircles an outer periphery of an edge periphery portion. The groove 11 has the width of 8.3 mm at an opening potion, the depth of 5 mm and the width of 2.5 mm at a base. Thus, the groove 11 is deeper and broader than a top ring groove 3. Furthermore, the angle of a sliding surface of the groove 11 is 60 degrees to a side surface.

The sprayed layer 2 comprises a lower sprayed layer 21 and an upper sprayed layer 22. The lower sprayed layer 21 is formed by spraying a spraying material in the direction which is diagonal to a sliding surface of the groove 11 at the angle of 30 degrees. The upper sprayed layer 22 is formed on the base of the groove 11 and both of the sprayed layers 21 and 21 by spraying the spraying material in the direction which is perpendicular to the base. The top ring groove 3 is formed by grinding the upper sprayed layer 22.

In this embodiment, the spraying material is mixed powder which comprises 90 wt % of carbon steel having an average particle diameter of 40 micron and 10 wt % of aluminum alloy having an average particle diameter of 40 micron.

Figure 13:
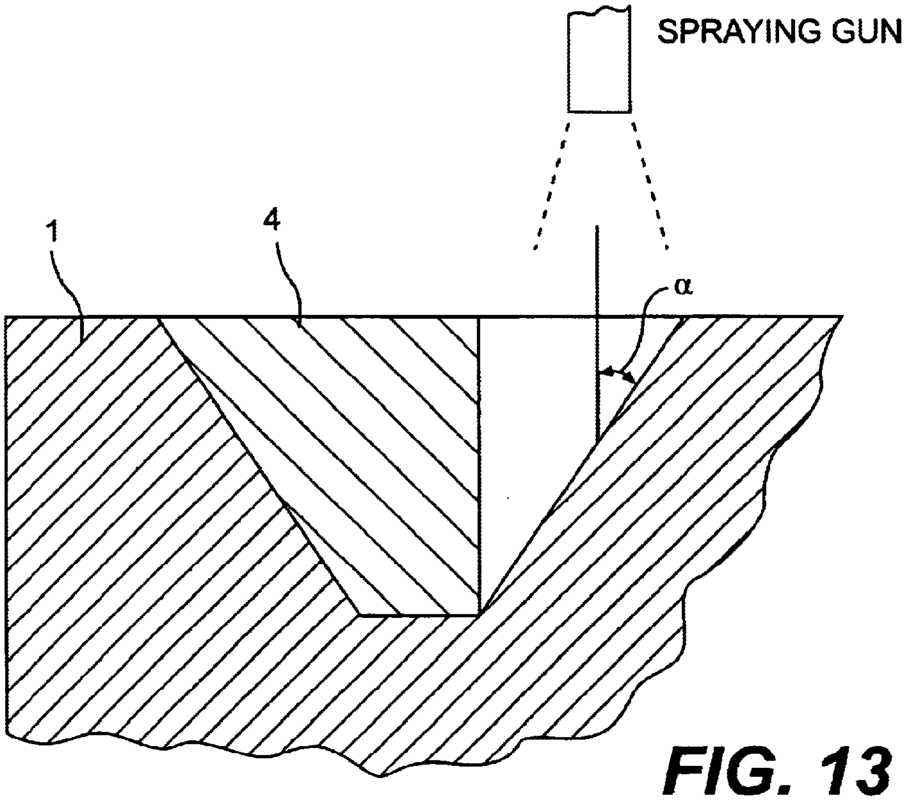
FIG. 13 is a typical enlarged diagram for showing a process for primarily spraying a spraying material in the second embodiment.

A method of spraying the spraying materials is HVOF spraying method. As shown in FIG. 13, one lower sprayed layer 21 is formed as follows. The base and one sliding surface of the groove 11 are covered with a masking material 4. The spraying material is sprayed by a thermal spraying gun in the direction which is diagonal to the other sliding surface of the groove 11 at the angle of "alpha". As a result, one lower sprayed layer 21 is formed on one sliding surface of the groove 11. The other lower sprayed layer 21 is formed on the other sliding surface of the groove 11 in the same manner as that of one sprayed layer. After that, the masking material 4 is removed, and the upper sprayed layer 22 is formed by spraying the spraying material in the direction which is perpendicular to the base of the groove 11. The lower sprayed layer 21 comprises 38 wt % of aluminum alloy and 62 wt % of carbon steel. On the contrary, the upper sprayed layer 22 comprises 15 wt % of aluminum alloy and 85 wt % of carbon steel. Such composition of the upper sprayed layer is similar to that of the spraying material.

The top ring groove 3 of this embodiment is similar to that of the first embodiment. As shown in FIG. 12, the top ring groove 3 is marked off by a base 33 and two opposed surfaces 31 and 32 which are opposite to each other and spread in the direction toward depth. The opposed surfaces 31 and 32 spread in depositional direction of the spraying material. A thin side surface of each spraying material is exposed on the opposed surfaces 31 and 32 in the condition that each spraying material is deposited. On the contrary, the base 33 is parallel to the surface on which the spraying material spreads. So, each spraying material is exposed on the base 33 in the condition that it spreads on the base 33.

The piston of this embodiment is similar to that of the first embodiment. In the piston of this embodiment, the opposed surfaces 31 and 32 of the top ring groove 3 is a section of the deposited spraying material. The edge surface of each spraying material which is disposed in the shape of a thin disk by spraying is exposed on the opposed surfaces 31 and 32. As a result, the area of each spraying material which is exposed on the opposed surfaces 31 and 32 is narrow. The opposed surfaces 31 and 32 are formed by a large number of spraying materials. So, the opposed surfaces 31 and 32 hardly show friction characteristics of a specific spraying material or some spraying materials. They exhibit average friction characteristics of whole spraying materials. Therefore, stable coefficient of friction can be obtained.

Each spraying material is arranged in such a manner that it stands against the opposed surfaces 31 and 32. One end of each sprayed layer forms the opposed surface, and the other end of each sprayed layer is inside and far from the opposed surfaces 31 and 32. Each spraying material for forming the opposed surfaces 31 and 32 is hardly come off from the opposed surfaces 31 and 32. So, abrasion which is caused by fallout hardly occurs. Since the area of one piece of the spraying material which is exposed on the opposed surfaces 31 and 32 is narrow, stress which is acted on one piece of spraying material is small. Therefore, fallout of the spraying material comes to rarely occur, and wear resistance becomes excellent.

In this embodiment, the upper sprayed layer 22 in which the top ring groove 3 is formed is held by the piston body 1 via the lower sprayed layer 221. The amount of aluminum alloy in the lower sprayed layer 21 is 38 wt %, and the amount of aluminum alloy in the upper sprayed layer 22 is 15 wt %. Such composition of the lower sprayed layer 21 is similar to that of the piston body 1. The lower sprayed layer 21 has high affinity to the upper sprayed layer 22. The difference of thermal expansion scarcely occurs between the lower sprayed layer 21 and the upper sprayed layer 22. The composition of the lower sprayed layer 21 is different from that of the upper sprayed layer 22. However, both of the sprayed layers 21 and 22 are originally constituted by the same spraying material, so they are almost integral structure. Therefore, the upper sprayed layer 22 is firmly held by the piston body 1. When there occurs relatively large difference of thermal expansion between the sprayed layer 22 and the piston body 1, such difference is softened by the lower sprayed layer 21. As a result, any inconveniences such as crack hardly occur among the piston body 1, the lower sprayed layer 21 and the upper sprayed layer 22.

Figure 14:
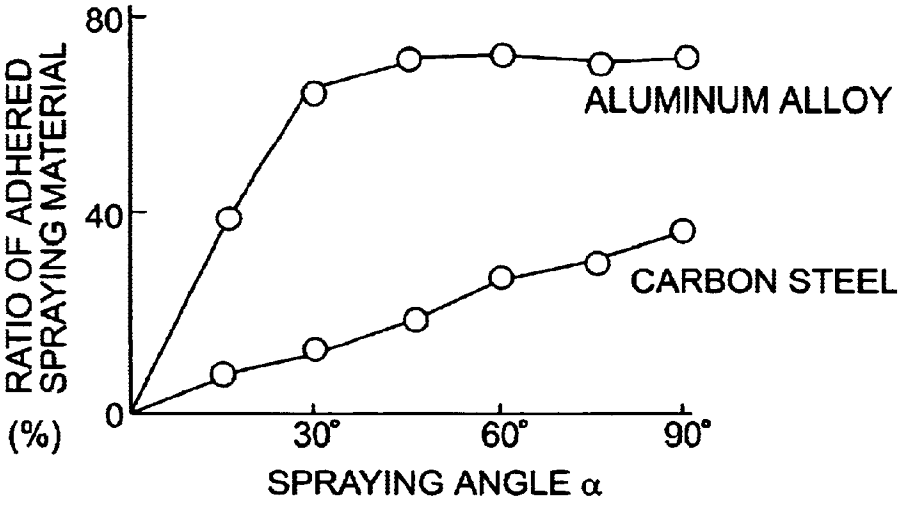
FIG. 14 is a chart for showing the relationship between a spraying angle and the ratio of an adhered spraying material when a spraying material is mixed powder.
Figure 15:
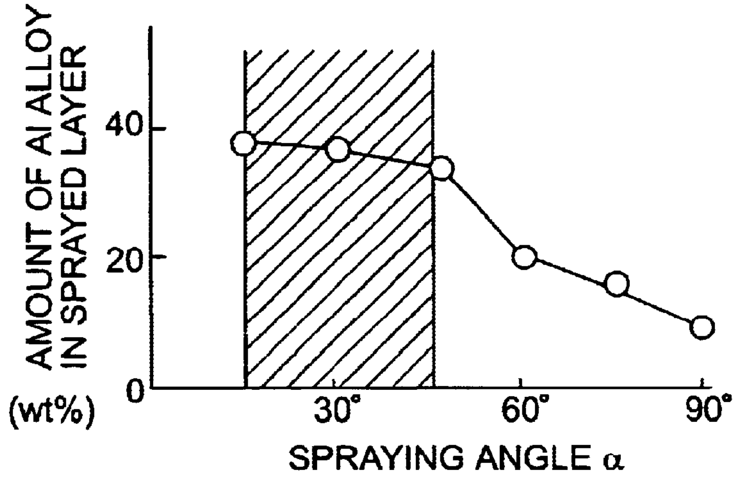
FIG. 15 is a chart for showing the relationship between a spraying angle and the ratio of aluminum alloy in the sprayed layer when a spraying material is mixed powder.

FIG. 14 shows the relationship between the spraying angle "alpha" to the surface to be sprayed which is shown in FIG. 13 and the ratio of an adhered spraying material such as carbon steel and aluminum alloy which is used in the second embodiment. FIG. 15 shows the relationship between the spraying angle "alpha" and the ratio of aluminum alloy in the sprayed layer.

As shown in FIG. 14, when the mixed powder comprising carbon steel and aluminum alloy which have remarkably different fusion temperature each other is used as the spraying material, the ratio of adherence is different in accordance with the spraying angle. Therefore, as shown in FIG. 15, the composition of the sprayed layer is largely changed.

Considering the ratio of adherence and the change in the composition of the sprayed layer, it is preferable that the spraying angle for forming the lower sprayed layer is set to be 15 to 45 degrees. It is also preferable that the spraying angle for forming the upper sprayed layer is set to be almost 90 degrees.

Figure 16:
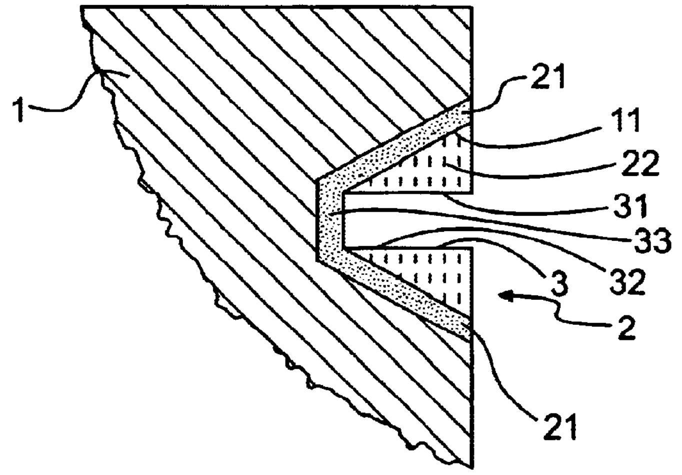
FIG. 16 is an enlarged section diagram for showing an edge portion of a piston in a codified example of the second embodiment of the present invention.
Figure 17:
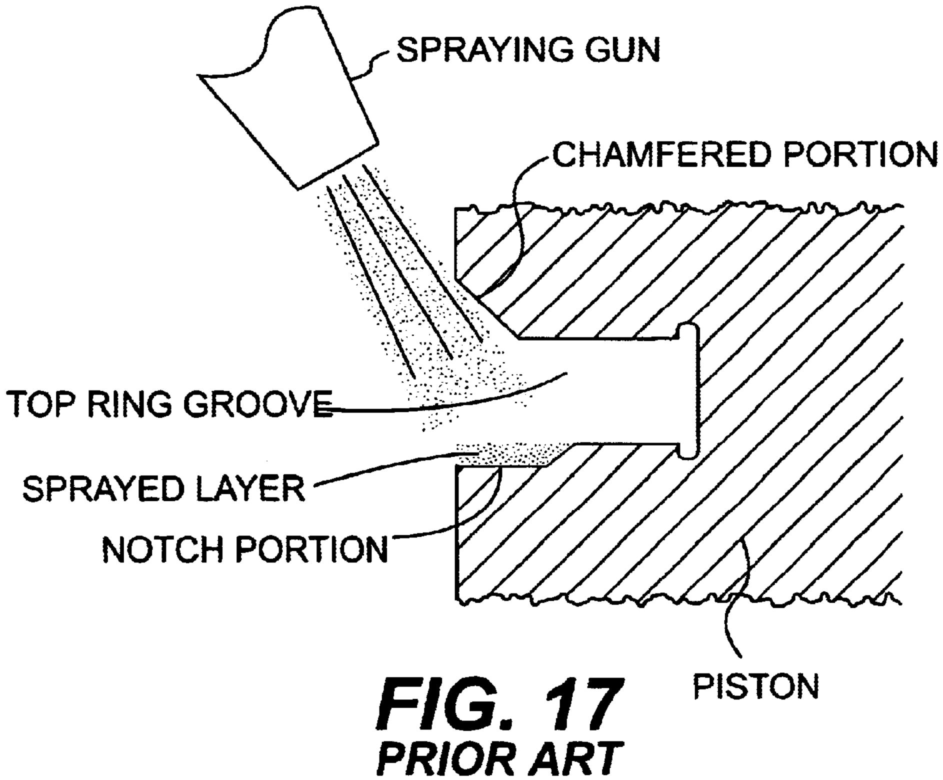
FIG. 17 PRIOR ART
FIG. 17 is a typical diagram for showing the formation of a top ring groove of a piston in the conventional method.

FIG. 16 shows a modified example of the second embodiment. In this modified example, the spraying material is sprayed in the direction along the tangential line of the groove 11 in such a manner that the piston body 1 rotates. Then, the spraying material comes to be sprayed in the direction which is perpendicular to the groove 11. As a result, the lower sprayed layer 21 is formed on the whole of the sliding surface and the base of the groove 11. The upper sprayed layer 22 is formed by spraying in the same manner as that of the second embodiment. The top ring groove 3 is formed in the upper sprayed layer 22.

In the modified example, more and more the lower sprayed layer 2i is close to the groove 11, more and more the sliding surface contains aluminum alloy. The lower sprayed layer 21 and the upper sprayed layer 22 are almost integral so as to vanish a boundary between them. Therefore, in this modified example, the upper sprayed layer 22 which forms the top ring groove 3 is more firmly held by the groove 11.

In the second embodiment, the spraying material comprising not less than two kinds of spraying particles having each different fusion temperature one another is used. When such spraying material is sprayed in the direction which is diagonal to the surface to be sprayed, particles in semi-fusing condition collide with and rebound from the surface. Namely, the ratio of adherence of semi-fusing particles decreases due to the following conditions. The spraying material comprising not less than two kinds of spraying particles having each different fusion temperature one another is used, and such spraying material is sprayed in the direction which is diagonal to the surface, and the spraying condition is set to be proper so that a part of particles are in semi-fusing condition. Therefore, the sprayed layer shows low ratio of semi-fusing particles.

The spraying material comprising not less than two kinds of spraying particles having each different fusion temperature one another means that each kind of spraying particles has each different fusion temperature under the spraying condition. Concretely, not less than two kinds of spraying particles has each different fusing point, or not less than two kinds of spraying particles has each different particle diameter in which the central portion of the particle having larger diameter is in semi-fusing condition.

The above spraying particle can be variously combined with each other in accordance with each purpose.

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a piston body for sliding within a cylinder, the piston body being formed of an aluminum alloy and having at least one ring groove encircling an outer periphery of the piston body, which method comprising the steps of:

forming in the piston body a first groove which is broader than said ring groove and which encircles the outer periphery of the piston body;

spraying a granular spraying material, containing at least particles of a carbon steel and 10 to 50 wt % of particles of an aluminum alloy containing 15–20 wt % silicon, into said first groove in a direction which is perpendicular to the outer periphery of the piston body so that said particles collide with a base in the first groove in a semi-fusing condition and form at least disks of said carbon steel and disks of said aluminum alloy disposed one on another in the first groove in a direction along the depth of the first groove, to form a sprayed layer; and forming the ring groove within said sprayed layer by grinding or cutting said sprayed layer in a direction which is perpendicular to said outer periphery of said piston body, said ring groove having an inner side surface composed of thin elliptic cut surfaces of said disks of said carbon steel and said disks of said aluminum alloy.

2. The method of claim 1, wherein said spraying material comprises 5 to 40 wt % of carbide, 10 to 50 wt % of aluminum alloy and the rest of carbon steel.

3. The method according to claim 1, wherein a cross-section of said first groove has a trapezoidal shape, and the angle of a slant face of said first groove is not more than 75 degrees with respect to said outer periphery.

4. The method according to claim 3, wherein said angle of said slant face is not more than 60 degrees to said outer periphery.

5. The method according to claim 1, wherein said carbon steel contains not less than 0.3 wt % of carbon.

6. The method according to claim 5, wherein said carbon steel contains not less than 0.5 wt % of carbon.

7. The method according to claim 1, wherein said spraying material contains carbide selected from the group consisting of Cr-carbide, Mo-carbide, Fe-carbide, Ta-carbide, Ti-carbide, V-carbide, Nb-carbide, W-carbide and the mixture thereof.

* * * * *